United States Patent [19]

Bouffechoux

[11] 4,362,283

[45] Dec. 7, 1982

[54] INSTRUMENT STAND

[75] Inventor: Lucien Bouffechoux, Villemonble, France

[73] Assignee: Essilor International (Compagnie Generale d'Optique), Creteil, France

[21] Appl. No.: 213,106

[22] Filed: Dec. 4, 1980

[30] Foreign Application Priority Data

Dec. 6, 1979 [FR] France .................. 79 29984

[51] Int. Cl.³ .............. F16M 11/12; A61B 3/00
[52] U.S. Cl. .................. 248/183; 248/278; 350/484; 351/38
[58] Field of Search ............ 248/278, 178, 183, 371, 248/122, 476; 350/484; 351/38

[56] References Cited

U.S. PATENT DOCUMENTS

| 1,887,801 | 11/1932 | Cole | 248/183 X |
| 2,512,636 | 6/1950 | Flynt | 248/278 X |
| 2,622,606 | 12/1952 | Skivesen | 248/178 X |
| 2,670,496 | 3/1954 | Knight | 104/93 X |
| 2,892,419 | 6/1959 | King | 104/94 X |
| 3,648,617 | 3/1972 | Metzner | 104/94 |
| 3,830,165 | 8/1974 | Turner | 104/94 X |

FOREIGN PATENT DOCUMENTS 1315937 12/1962 France .
7800732 9/1978 France .

Primary Examiner—J. Franklin Foss
Attorney, Agent, or Firm—Burgess, Ryan and Wayne

[57] ABSTRACT

The invention concerns the construction of optical instruments. The instrument stand allows the instrument to be oriented along three converging axes, and to be held sufficiently firmly in the chosen position. The stand comprises a head which rotates round the first of the three axes of rotation. The head comprises two tracks of overall cylindrical form, the common axis of revolution of which constitutes the second axis of rotation of the instrument; the head also contains two runners which can move along the tracks, and each runner comprises a shaft which can rotate, with friction contact, on its axis. The instrument is fixed to two shafts, which share the same axis, this axis constituting the third axis of rotation of the instrument.

The invention also concerns application of such devices to a stand for measuring instruments used in making spectacles.

7 Claims, 3 Drawing Figures

INSTRUMENT STAND

The present invention is an instrument stand which allows an instrument to be oriented along three converging axes, and to be held firmly in the chosen position, without the need for special locking devices.

More specifically, the invention concerns an instrument stand equipped with means of fitting the instrument to the stand, which allows the instrument to be orientated, in relation to its position when at rest, around one geometrical axis X of the instrument, around another geometrical axis Y of the same instrument, intersecting the axis X at a fixed point, and around a third geometrical axis Z of the same instrument, perpendicular to the axis Y which passes through the point of intersection of X and Y, the stand comprises a head which rotates on a shaft that coincides with the axis X when the instrument is at rest, and which is combined with means for orienting the instrument around axes Y and Z.

The term "instrument" is used generally to comprise any appliance used to perform an operation, such as an optical appliance to obtain a photographic record of the position of a patient's eyes in relation to the geometrical characteristics of the lenses of a spectacle frame. Such an appliance is described in French Pat. No. 1 315 937 and its additions.

To permit such an instrument to be positioned properly in front of a patient wearing a spectacle frame, the instrument must be able to be oriented along three converging axes, so that the normal carriage of the patient's head can be taken into account. It is much more convenient to get the patient to retain a position that is natural to him, in this case the way he carries his head, and orient the measuring instrument accordingly, rather than adjusting the patient's head to suit the appliance, which could lead to serious discrepancies in measurements.

Stands already exist which permit an instrument to be oriented along two converging axes, and which involve friction contacts that permit the instrument to be held in the chosen position, without any need for special locking or screw devices. French Pat. No. 78 00732 describes such a stand.

BRIEF DESCRIPTION OF THE INVENTION

Rotation round three converging axes, equivalent to rotation around a single point, and maintenance of an instrument weighing several kilos in a chosen position raise a number of problems, for which the present invention provides convenient solutions, while making use of simple and consequently inexpensive mechanical devices.

The instrument stand corresponding to the present invention is characterized by the fact that the means of orientation comprise two runners, each equipped with wheels which run along separate tracks located on opposite sides of the stand head which present circular profiles defined around axis Y(Y-Y'), the treads of the runner wheels comprise elastically flexible components, and each runner also comprises a revolving shaft mounted with friction contact and extending along axis Z(Z-Z') towards the point of intersection, these shafts being fitted with means of attaching the instrument to the stand, while the head rotates round axis X(X-X') by means of a friction contact assembly.

The invention will now be described in greater detail, with reference to the accompanying figures, although it is in no way confined to such description and figures:

BRIEF DESCRIPTION OF THE DRAWINGS

On these figures, the same or similar items bear the same reference numbers. For example, they show the instrument 1 in diagrammatical form, outlined in a broken line.

DETAIL DESCRIPTION OF THE INVENTION

Figure 1:
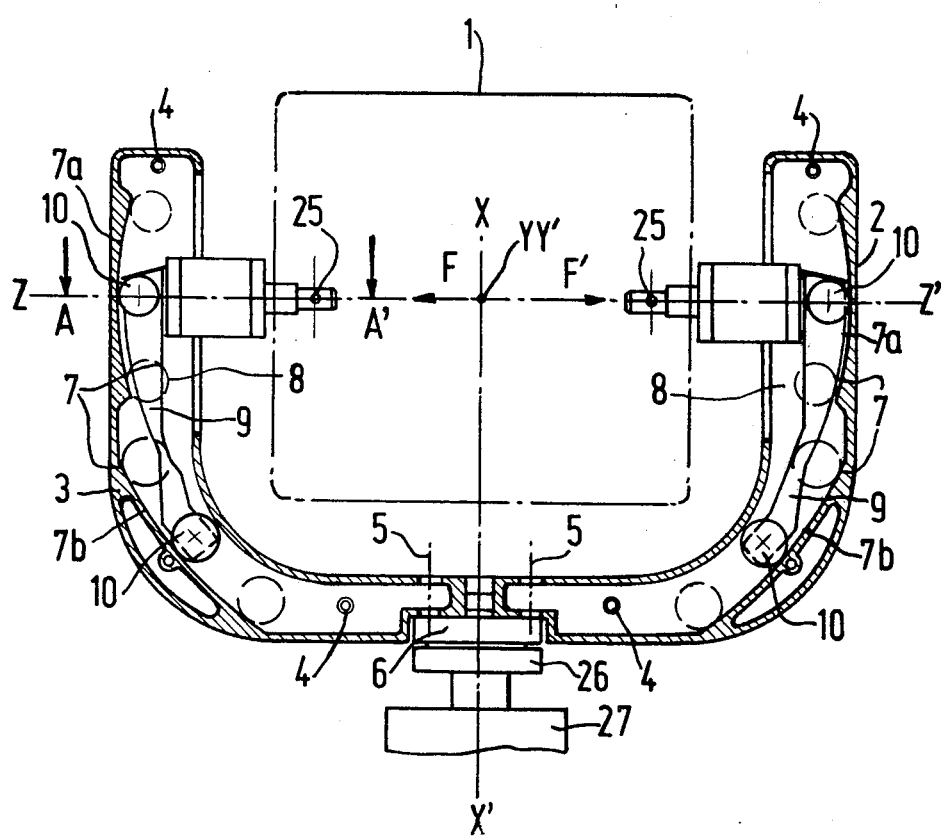
FIG. 1 shows a cross section of one embodiment of the stand.
Figure 3:
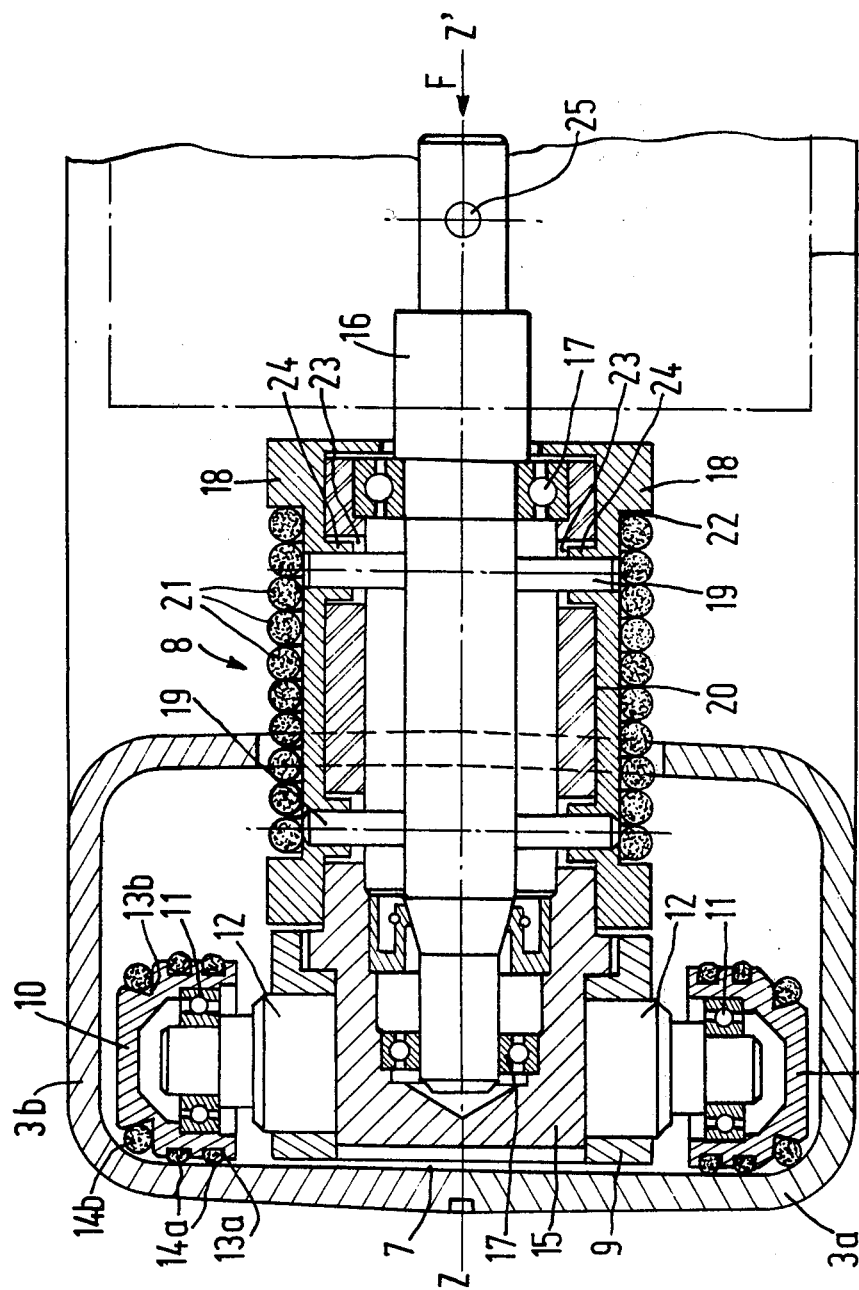
FIG. 3 shows a cross section taken along the line A—A on FIG. 1.

On FIGS. 1 and 3, the stand 2 comprises a head 3 which rotates round an approximatively vertical axis X-X'; this the first axis of rotation of the instrument 1.

To this effect the head 3 is attached to a first shaft 6, by means of a number of screws (not shown), positioned on the axes 5. The shaft 6 is mounted with friction contact on a second fixed shaft 26. This rotation friction contact may comprise a method known in the existing art, involving blades which fit into one another.

The head 3 comprises a casing comprising two parts 3a and 3b, which are held together and positioned in relation to each other by a number of centering rods 4.

The parts 3a and 3b are rough-cast, and may be manufactured by casting or, preferably, by injection of a low-density metal such as an aluminium alloy.

The inside of the head 3 is hollowed out to form two tracks 7, located symmetrically in relation to axis X-X', of overall cylindrical form, and on the same axis Y-Y', which intersects axis X-X' at right angles, and which comprises the second axis of rotation of the instrument. Seen in cross section, these tracks comprise a straight portion extended at each end by a rounded portion, approximately forming the arc of a circle.

Each track 7 carries a runner 8, consisting of a frame 9 with two sets of wheels 10 at each end. These wheels move along the track 7, each wheel being mounted on ball bearings on an axle 12 attached to frame 9.

Each wheel contains at least three peripheral grooves 13a and 13b, into which fit at least three O-rings 14a and 14b. These rings are preferably made of a semi-rigid material which can withstand considerable elastic deformation when crushed. Two of these O-rings 14a are in contact with the straight part of the runner track 7; the third 14b fits inside the groove 13b at the end of each wheel 10, and is in contact with the curved part of the track 7. The groove 13b accordingly has an overall tapering form.

A sleeve is also attached to the frame 9 of the runner 8, along an axis Z-Z', at right angles to the wheel axes, and a shaft 16 rotates on two bearings 17 inside this sleeve.

There is also friction contact between the sleeve 15 and the shaft 16. Two half-casings 18 are attached to the shaft 16, each by means of two projecting studs 24 on the casings which fit into two apertures 23 in the sleeve, and two pins passing through these apertures into the shaft 16, thereby holding each half-casing in position axially on the outer surface 20 of the sleeve 15. A number of elastic O-rings 21, which fit into a recess 22 on the disengaged outer surface of the casings 18, cause the sleeve 15 to grip the shaft 16 in a radial direction by exerting regulated and uniformly distributed pressure on the half-casings and consequently on the sleeve 15.

The instrument 1 is fitted between the two ends of the shafts 16, so that considerable force is exerted on each runner, in the direction of the arrows F and F′, tending to push them apart, and resulting in crushing of the O-rings 14a and 14b, sufficient to keep the instrument steady, when no force is exerted on it to make it move round the axis Y-Y′, as the runners 8 move along the tracks 7. Naturally, the force exerted in this way on each runner is not powerful enough to require any strenuous effort from a person wishing to orient the instrument round the axis Y-Y′.

The same applies to the pressure exerted on each sleeve 15 by the half-casings 18, through the O-rings 21, in order to rotate and hold the instrument in a position on the axis Z-Z′ of the shafts 16. A hole 25 is provided at the end of each shaft 16, so that a pin or bolt can be inserted to hold the instrument 1 between the shaft-ends.

In order to create sufficient pressure along the arrows F and F′ to hold the instrument steady, the gap between the pins or bolts holding the instrument is greater than the gap between the holes 25 on the shafts 16 when the runners 8 are on the tracks 7 and the O-rings 14a and 14b are not subjected to any crushing force.

In the first embodiment of the invention, illustrated in FIG. 1, each track 7 comprises two separate portions 7a and 7b, with different radii but the same axis of revolution Y-Y′. The wheels 10 at the lower end of each runner 8 have a larger radius than the other wheels.

Figure 2:
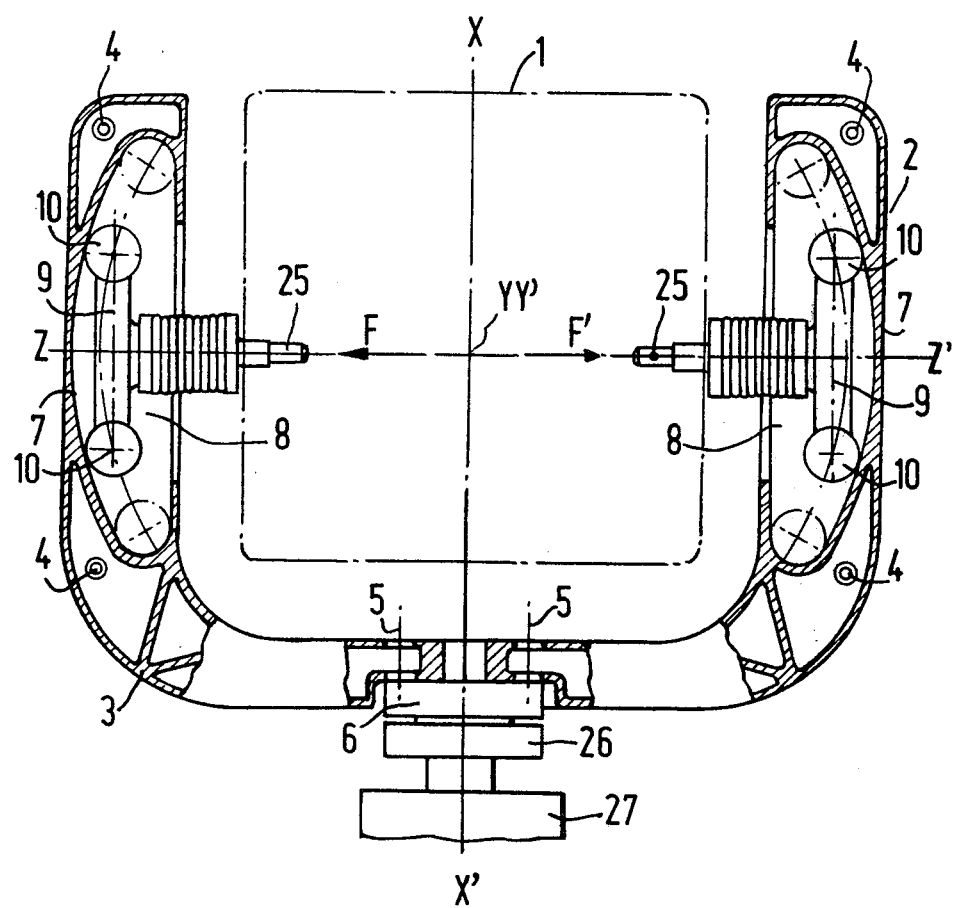
FIG. 2 shows a cross section of another embodiment of the invention.

In the second embodiment illustrated in FIG. 2, the tracks 7 each consist of a single portion, and the shaft 16 is located equidistant from each pair of wheels 10.

There may be more than two O-rings 14a on each wheel 10, in order to increase the tread surface of each runner, depending on the weight of the instrument to be used.

The fixed shaft 26 is mounted on a vertically and horizontally adjustable platform 27, to allow the instrument on the stand to be positioned correctly in front of the patient. This platform does not form part of the present invention, and will not be described in any further detail.

In both embodiments illustrated and described here, the tracks 7 are located inside the head 3. In an alternative embodiment, these tracks may be located outside the head.

The invention is naturally in no way confined to the embodiments described and illustrated here: many other variants are possible, for someone skilled in the art. For example, in another embodiment, the frame 9, shafts 12 and sleeve 15 can form a single component, obtained by casting, the surface required for the bearings 11 and 17 being subsequently machined. This makes assembly of the stand much simpler.

What is claimed is:

1. An instrument stand equipped with means for fitting an instrument to the stand, and for allowing the instrument to be oriented, in relation to its position when at rest, around one geometrical axis X of the instrument, around a second geometrical axis Y of the same instrument, intersecting the axis X at a fixed point, and around a third geometrical axis Z of the same instrument, perpendicular to the axis Y and also passing through the point of intersection of axes X and Y, said stand comprising:

a head which rotates on a shaft that coincides with the axis X when the instrument is at rest, said head including means for orienting the instrument around axes Y and Z;

orientation means comprising two runners equipped with respective pairs of runner wheels which run along separate tracks located on opposite sides of said head, said tracks presenting circular profiles defined around the axis Y, the treads of the runner wheels being elastically flexible, one of the pairs of wheels on each runner being positioned at a greater distance from the axis Y than the other of the pair of wheels on the same runner, each of said tracks comprising two portions, one portion guiding each of the pair of wheels on each runner, said portions being positioned at different distances from the axis Y and presenting different radii with respect to said axis, each runner comprising a revolving shaft mounted with friction contact and extending along axis Z towards the point of intersection of all three axes, said revolving shafts being fitted with means for attaching the instrument to the stand; and a friction contact assembly for enabling said head to rotate around the axis X.

2. An instrument stand according to claim 1, wherein the runners each comprise two pairs of wheels, both wheels in each pair rotating on a common axis perpendicular to axis Z.

3. An instrument stand according to claim 1, wherein each track, seen in cross section at right angles to axis Y, comprises a straight portion extended at each end by a rounded portion, in the form of an arc of a circle.

4. An instrument stand according to claim 1, wherein the treads of said runner wheels comprise O-rings which fit into peripheral grooves on each runner wheel.

5. An instrument stand according to claim 1, wherein each of the shafts on the runners is disposed inside a sleeve attached to the runner frame, while two half-casings which rotate with each shaft are urged against the outside surface of the sleeve by a number of elastic O-rings placed in circular recesses on the outside surface of the half-casings.

6. An instrument stand according to claim 5, wherein each of said sleeves carries axles on which the runner wheels are mounted.

7. The instrument stand according to claim 1, wherein the radius of curvature of each track remains constant throughout the length thereof.

* * * * *